(12) United States Patent
Berge

(10) Patent No.: US 7,864,440 B2
(45) Date of Patent: Jan. 4, 2011

(54) OPTICAL LENS WITH VARIABLE FOCAL LENGTH

(75) Inventor: Bruno Berge, Lyons (FR)

(73) Assignee: Varioptic, S.A., Lyons (FR)

( * ) Notice: Subject to any disclaimer, the term of this patent is extended or adjusted under 35 U.S.C. 154(b) by 15 days.

(21) Appl. No.: 12/515,767

(22) PCT Filed: Nov. 23, 2007

(86) PCT No.: PCT/EP2007/062774

§ 371 (c)(1),
(2), (4) Date: May 21, 2009

(87) PCT Pub. No.: WO2008/062067

PCT Pub. Date: May 29, 2008

(65) Prior Publication Data

US 2010/0020285 A1    Jan. 28, 2010

(30) Foreign Application Priority Data

Nov. 24, 2006  (EP)  .................................. 06301179

(51) Int. Cl.
- G02B 3/12 (2006.01)
- G02B 1/06 (2006.01)
- G02C 7/06 (2006.01)

(52) U.S. Cl. .................... 359/666; 359/665; 351/168

(58) Field of Classification Search ......... 351/159–176; 359/665–667

See application file for complete search history.

(56) References Cited

U.S. PATENT DOCUMENTS

| 4,477,158 A | 10/1984 | Pollock et al. |
| 2004/0218283 A1* | 11/2004 | Nagaoka et al. ............. 359/665 |
| 2004/0227063 A1 | 11/2004 | Viinikanoja |

FOREIGN PATENT DOCUMENTS

| WO | 91/17463 A1 | 11/1991 |
| WO | 96/38744 A1 | 12/1996 |
| WO | 00/58763 A1 | 10/2000 |
| WO | 2004/049927 A1 | 6/2004 |
| WO | 2005/003842 A1 | 1/2005 |
| WO | 2005/088388 A1 | 9/2005 |
| WO | 2006/027522 A1 | 3/2006 |
| WO | 2006/092804 A2 | 9/2006 |

OTHER PUBLICATIONS

International Search Report w/translation from PCT/EP2007/062774 dated Feb. 21, 2008 (3 pages).

* cited by examiner

*Primary Examiner*—Darryl J Collins
(74) *Attorney, Agent, or Firm*—Osha • Liang LLP

(57) ABSTRACT

The invention concerns an optical lens comprising a cavity formed by two transparent windows and a peripheral frame positioned in between, said cavity containing first and second liquids, non miscible, forming an interface, said interface being movable by electrowetting on a wall of said peripheral frame by application of a voltage between first and second electrodes, wherein said wall has a non symmetrical revolution surface, the geometrical shape of which is calculated such that said interface is of a predetermined shape, for example substantially spherical, for at least one value of said voltage.

14 Claims, 4 Drawing Sheets

OPTICAL LENS WITH VARIABLE FOCAL LENGTH

FIELD OF THE INVENTION

The present invention relates to optical lenses of variable focal length and more specifically ophthalmic lenses of variable focal length and spectacles using them.

DESCRIPTION OF THE PRIOR ART

Many documents present spectacles which are equipped with variable focal lenses instead of fixed focal glass lenses. The goal is to provide to the user of such spectacles a way to have a focused image when viewing at different object distances: some people use spectacles or ophthalmic lenses for far view and use a different pair of spectacles for close view (when reading for instance).

Especially people who need an eyesight correction both at long distances and short distances, and who have lost all or part of their accommodation possibility would benefit from lenses using a variable optical power or focal length (the optical power of a thin lens is 1/f, where f is the focal length in air).

Particularly, for people who had surgery after a cataract problem, have been implanted a fixed focal implant was implanted resulting in a total loss of the accommodation. As a consequence they loose totally the accommodation.

PCT application WO 96/38744 (see FIG. 1) for instance deals with an adjustable focal lens (11a and 11b) using a transparent chamber filled with an adjustable quantity of transparent liquid, which enables to adjust the refraction of the spectacles 10. This is particularly advantageous for cheap lenses to be sold in developing countries.

PCT application WO 2005/003842 A1 (FIG. 2) embedded a variable lens (21a and 21b) in spectacles 20. The variable lens comprises a refractive interface between two immiscible liquids, the radius of curvature of the liquid-liquid interface being changed using electrowetting, i.e. without having to have a pump to move liquids.

All previous examples show circular shaped lenses, whereas it is well known that most ophthalmic lenses used in spectacles are not circular.

Therefore, there is a need for lenses for spectacles which would have a variable optical power correction, as well as being non circular in shape.

In U.S. Pat. No. 4,477,158 (FIG. 3), a non circular lens 31 in a pair of spectacles 30 is shown, but the zone which is variable is circular 32. Therefore, only the zone 32 is variable, thus creating different refractive zones in the lens, which might be a problem for the user.

PCT application WO 91/17463 (FIG. 4) shows a non circular geometry of lens 40 for a deformable chamber filled with a transparent liquid. The space between a first rigid lens and a transparent membrane forming the chamber is deformable, which allows to vary the focal length or optical power of the lens 40. This patent application mentions the possibility of using non circular geometries. But the deformable membrane attached to the non circular perimeter will adopt a non spherical shape under pressure, for example like soap bubbles can be highly non spherical when the supporting frame is not circular. Such non spherical shape will create large optical aberrations, the main one being astigmatism aberration (locally the horizontal and vertical radii of curvature of the membrane are not the same). The consequence is a considerable blur in the image.

More generally, there is a need for controlling the shape of the interface having non-circular lenses.

The present invention is related to an optical lens with a variable optical power, having a large non circular clear pupil similar to a regular glass ophthalmic lens, where the optical power is homogeneous over a large part of the clear pupil. Around the clear pupil aperture where the optical power is variable and homogeneous, a peripheral zone would be transparent, with a fixed optical power.

SUMMARY OF THE INVENTION

According to a first aspect, the invention relates to an optical lens comprising a cavity formed by two transparent windows and a peripheral frame positioned in between, said cavity containing first and second liquids, non miscible, forming an interface, said interface being movable by electrowetting on a wall of said peripheral frame by application of a voltage between first and second electrodes, wherein said wall has a non symmetrical revolution surface, the geometrical shape of which is calculated such that said interface is of a predetermined shape, for example substantially spherical, for at least one value of said voltage.

According to a second aspect, the invention relates to optical spectacles including an optical lens of the first aspect.

BRIEF DESCRIPTION OF THE DRAWINGS

The objective, characteristics and advantages, together with others, of the present invention will be explained in detail in the following description of specific exemplary embodiments, given in a non-limiting way in conjunction with the attached figures among which.

DESCRIPTION OF THE INVENTION

Figure 1:
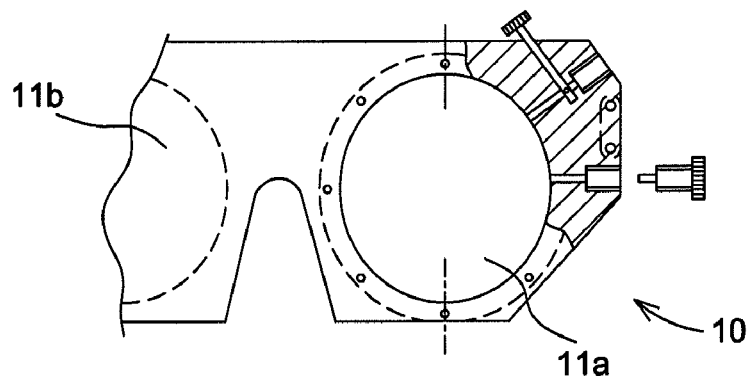
FIG. 1 is an adjustable focal length according to prior art (described above)
Figure 2:
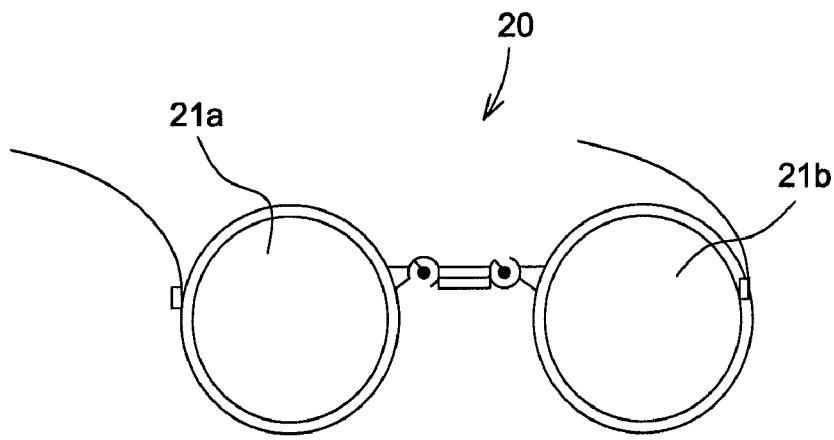
FIG. 2 is a variable lens for spectacles according to prior art (described above)
Figure 3:
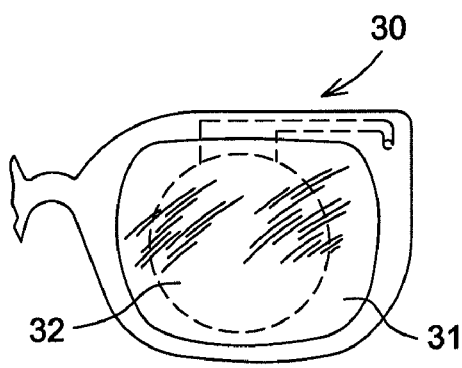
FIG. 3 is a non circular spectacles lens according to prior art (described above)
Figure 4:
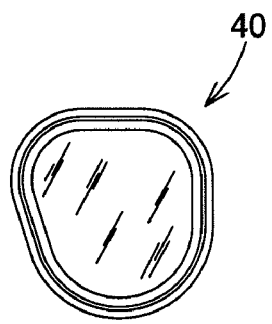
FIG. 4 is a non circular spectacles lens according to prior art (described above)
Figure 5:
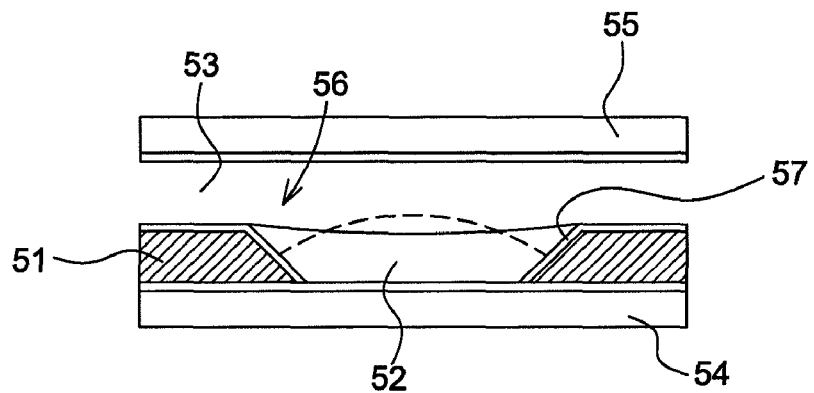
FIG. 5 is an illustrative example of an electrowetting based variable focal length lens according to prior art.

FIG. 5 represents an electrowetting based variable focal length lens according to prior art and described in the application WO 2006/027522 in the name of the applicant. It comprises a metallic piece part 51, forming a first electrode, with a conical internal wall 57 coated with an insulator/hydrophobic layer. A drop of a first insulating liquid 52, usually an oily based liquid, is disposed in the cavity formed by the conical wall and a lower window 54. An upper window 55 closes the cavity. The cavity is filled with a conducting liquid 53 (usually an aqueous liquid) and the two liquids form a liquid-liquid interface (56) able to move along the internal conical wall due to application of a voltage between the first electrode and a second electrode (not shown) in contact with the conductive liquid (electrowetting effect). The circular geometry of the internal wall makes the resulting shape of the liquid-liquid interface spherical. In this example, the curvature of the liquid-liquid interface is moved upwards at 0V, corresponding to the continuous line 56. The curvature changes to downwards curvature with progressive application of a voltage (dashed line 56) due to the electrowetting effect. In this prior art all pieces are symmetrical around an optical axis (not shown) resulting in a circular clear pupil.

The present invention describes an optical lens with a variable optical power based on the electrowetting effect but having a large non circular clear pupil similar to a regular glass ophthalmic lens, where the optical power is homogeneous over a large part of the clear pupil. Around the clear pupil aperture where the optical power is variable and homogeneous, a peripheral zone would be transparent, with a fixed optical power.

Figure 6:
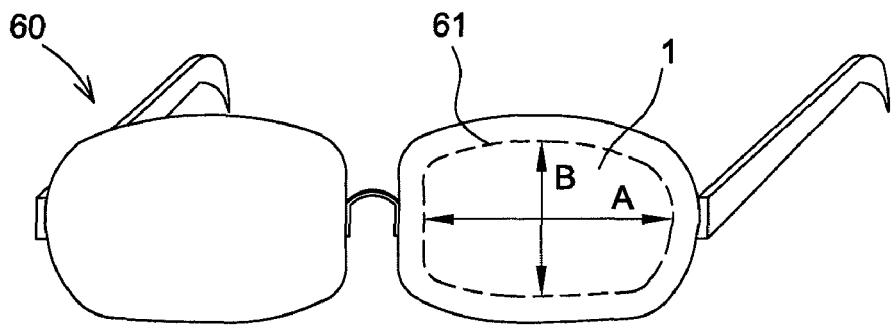
FIG. 6 is an illustrative example of spectacles using optical lenses according to the invention.

FIG. 6 represents an example of spectacles 60 using optical lenses 1 according to the invention, said optical lenses comprising peripheral frames 61 schematically represented in dashed lines. On FIG. 6 the largest dimension of the peripheral frame of the optical lens is noted A, and the smallest dimension is noted B.

According to a preferred embodiment, automatic or manual adjustment means, not shown in the FIG. 6, allow to control the focal length of the optical lenses 1.

A power supply is provided for the electrical alimentation of the adjustment means. This can be an autonomous power supply close to the lens or on the frame or the arms of the spectacles. The autonomous power source can be a button battery, a rechargeable button battery or any other source of energy captation, for example based on movements of the head.

According to a first embodiment, manual focal length adjustment means are provided. They consist for example in a remote control of the optical power of the lens, using a small remote control box in the user pocket, or a dedicated button placed on the spectacles frame or arms.

According to a second embodiment, automatic focal length adjustment means are provided. They are based for example on using a distance measurement device to estimate the distance to the object to be viewed, in order to automatically have the right focus in every situation. The adjustment means comprise for example a telemeter unit as distance measurement device. Alternatively, they comprise a device for monitoring the convergence of the user's eyes, for example comprising miniaturized cameras to monitor the convergence of the user eyes.

Figure 7A:
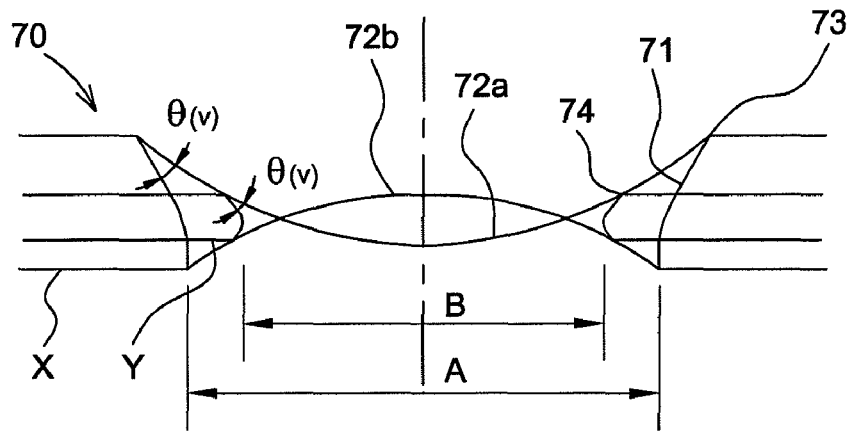
FIG. 7A is a cross-section view of a part of an embodiment of an optical lens according to the invention.
Figure 7B:
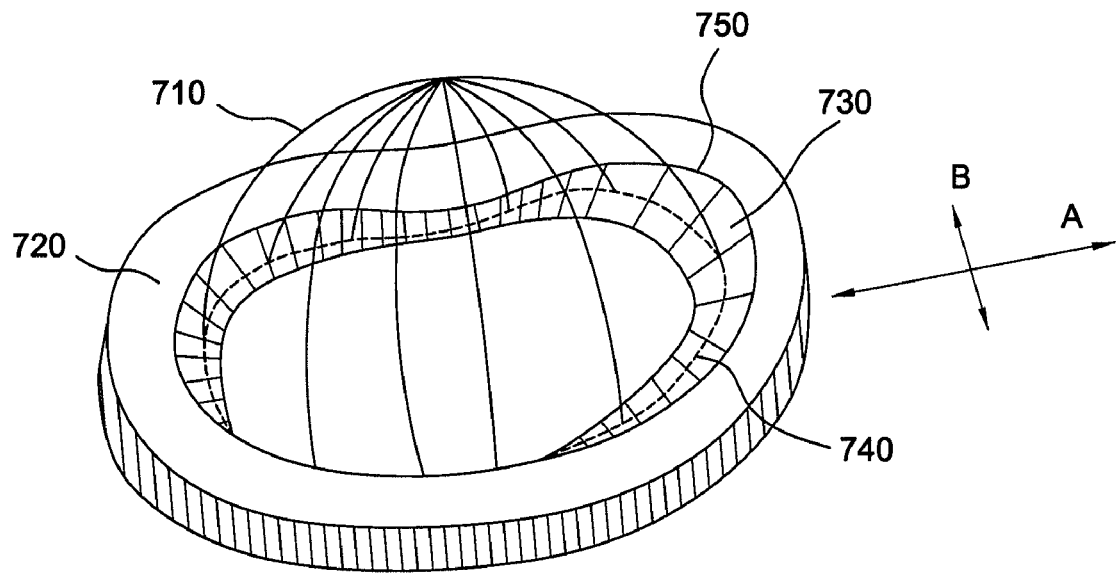
FIG. 7B is a 3D perspective view of the part shown on FIG. 7A.

FIGS. 7A and 7B show an example of the peripheral lens frame 70 of an optical lens according to the invention in a cross section view and in a 3D perspective view. The peripheral lens frame 70 is similar to the piece part 51 of FIG. 5, but presents a non circular geometry. It presents an internal wall 71 along which an interface liquid-liquid (72*a* or 72*b*) can move by application of a voltage as in the variable focal length lens according to prior art. The wall 71 has a non symmetrical revolution surface. On the FIGS. 7A and 7B, windows and coating are not shown.

FIG. 7A shows a superposition of two cross sections along lines A and B of a peripheral lens frame 70. On this figure, X and Y refers to the peripheral lens frame 70 according respectively to the cross sections along A and B. According to the invention, the geometrical shape of the wall 71 is calculated such that the liquid-liquid interface (72*a* or 72*b*) is kept spherical, at least at a given voltage, although it has a non symmetrical revolution shape. In other words, an angular edge 73 will correspond to the same edge 74, but at different positions along the perimeter of the peripheral lens frame. The liquid-liquid interface is represented as a single common line for the two cross sections. The spherical liquid-liquid interface is shown in two extreme positions. The 0 voltage position is shown as a continuous line 72*a* (V=0V), and the maximum voltage position is shown as a dotted line 72*b* (V=Vmax).

FIG. 7B shows a 3D view of the peripheral lens frame 70. The thickness of the lens frame is reduced for the smaller dimension B, whereas it will be thicker in the larger dimension A. The lateral slopes (surface 730) will be different in A or B directions. Further, the slopes of surface 730 might not be generated by straight lines (as in a simple conical hole) but rather by complex curves. Thus, the lens frame shape is a complex 3D shape, with thicker parts in the long direction A and thinner in the small dimension B. In addition, the angle between 730 and 720 surfaces is varying.

According to a preferred embodiment, the geometrical property of the internal wall 71 of the peripheral lens frame 70 to give a spherical shape to the liquid-liquid interface is kept for all intermediate voltages applied, whereas the figure shows only the two extreme cases 72*a* and 72*b* for clarity. As a consequence, the cross section of the peripheral lens frame presents a more complicated shape than a simple cone, as it is shown on FIG. 7B. The surface is calculated such that the contact angle θ(V) between the liquid-liquid interface and the wall is the same along the perimeter of the peripheral lens frame as it will be described further. On FIG. 7A, the interface 72*a* is shown for a voltage equal to 0V, which means that the angle is determined by the pinning of the interface line on the top edge 73 and 74.

According to a further embodiment, the variable optical lens of the invention is a n states variable lens, with n superior or equal to two, which means that the surface of the wall is calculated such that the liquid-liquid interface is spherical for n positions of the interface (i.e. n distinct values of the voltage). For example, in a two states variable lens (n=2), the surface of the wall is calculated such that the liquid-liquid interface is spherical for two positions of the interface (i.e. two distinct values of the voltage).

Figure 8:
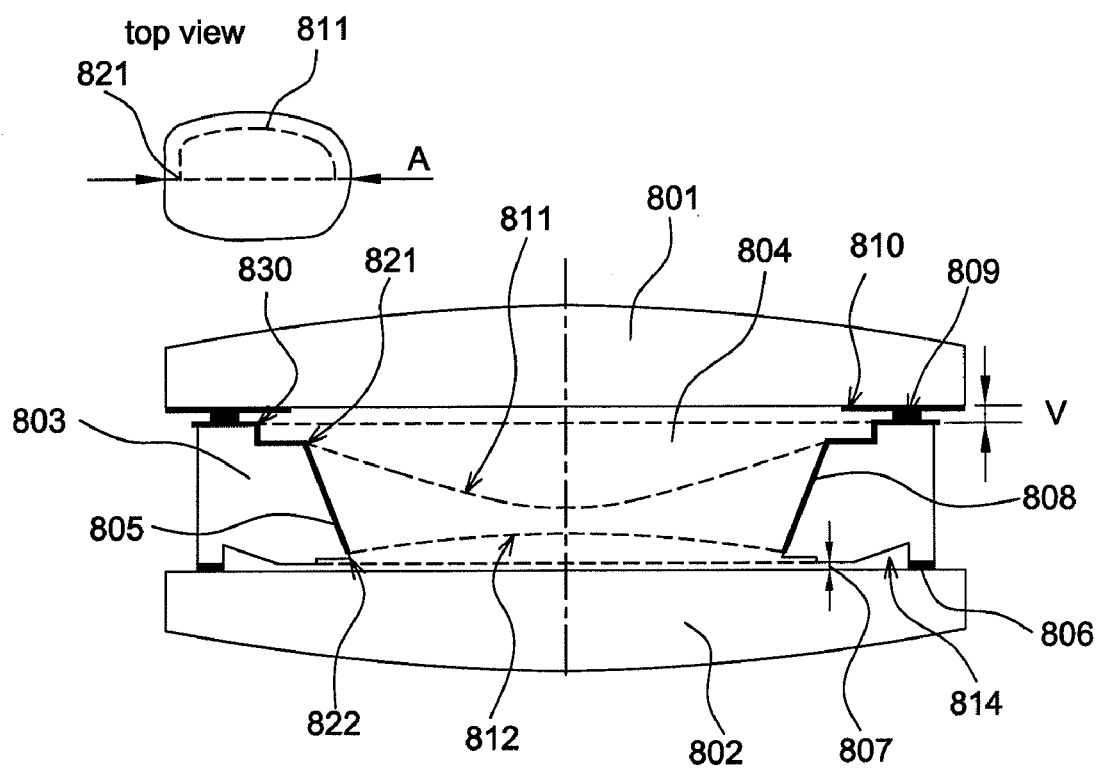
FIG. 8 represents a cross-section view of an exemplary optical lens according to the invention.

FIG. 8 represents a cross-section view of an exemplary optical lens according to the invention. It comprises a cavity 804 formed by two transparent windows, front 801 and rear 802, and a peripheral lens frame 803 in between. Two non-miscible liquids of different index of refraction are contained in the cavity 804. The liquid-liquid interface is made to move along the internal wall 805 of the peripheral lens frame 803 which is non circular. According to the invention, the shape of the wall 805 (including for example height, inclination, curvature) varies along the perimeter, such that the liquid-liquid interface is kept spherical, at least for the application of one value of the voltage. This combines the advantage of the variable power, with the advantage of having a non circular lens which is homogeneous over most of the clear pupil.

According to an advantageous feature of the invention, all constituting materials of the optical lens according to the invention are made of transparent materials (glass, transparent electrodes plastics etc. . . . ).

In the example of FIG. 8, windows 801 and 802 are curved (convex or concave) on their external faces and are flat at the internal faces. This enables to ensure a fixed eyesight correction, depending on the patient. This correction might be positive or negative, and includes eventually astigmatism. Alternatively, at least one of the windows is a fixed lens. Windows can be made in any suitable ophthalmic glass. The peripheral lens frame 803 is for example glued on the lower window 802, preferentially with a glue 806 containing balls which enables to control exactly the gap 807. The peripheral lens frame 803 is coated with a metal or ITO transparent electrode 808. The insulating/hydrophobic layer is not shown on the figure. A sealing mean (adhesive joint) is referred as 809. Ref 810 is a coated electrode, transparent or not. The voltage will be applied between 808 and 810. FIG. 8 shows the peripheral frame cross section along the long side A. The dotted lines 811 and 812 show the projected lines of the edges 821 and 822 respectively, seen behind the cross section plane. 830 is a step which is used to allow for a space between the upper window 801 and the edge 821, in order to avoid that the liquid-liquid interface come to touch the upper window. The cavity 804 and the gap 807 are used according to this example for trapping a gas bubble for accommodation of the liquid's thermal expansion.

With references to FIGS. 7B and 9A to 9C, it is now described how the geometrical surface of the internal wall of the peripheral frame can be calculated to keep the liquid-liquid interface spherical for at least one given applied voltage.

The aim of the calculation is to produce a supporting surface (805) for the liquid/liquid interface in the liquid lens based on electrowetting according to the invention. This supporting surface presents a non axisymmetric shape but the resulting shape of the liquid-liquid interface has to be spherical, in order to produce a lens of good optical quality.

On FIG. 7B, the liquid-liquid interface 710 is shown at a given voltage (the different voltages will generate a family of such spherical surfaces). Ref 720 is an upper flat portion of the peripheral lens frame, 730 is the supporting surface which is non axisymmetric, and 740 represents the curve of the triple line interface defined by the intersection between the sphere 710 and the surface 730. Finally, 750 represents the edge between the surface 720 and the surface 730. Note that surface 720 is basically flat but non planar.

The calculation method of the supporting surface 730 can be based on a finite element calculation. The starting point is to define first the top edge of the surface (750 in FIG. 7B), which is an arbitrary choice from the designer. Then the method allows to construct step by step the surface, from top to bottom. Each step allows to construct the new position of the line 740, which then adds a new portion of the surface 730 by bridging between the previous position of the line 740 and its new position. At each iteration, there are a number of choices coming from the designer. For instance, the value of the step increase of the contact angle from one position to the next position is adjusted according to the curvature of the surface.

The above method can be easily implemented with a well known calculation software (Excel, C++ or math SW). The implementation of the method is detailed below, and mainly comprises two stages, an initialization stage and an iteration stage:

Initialization:

Il will define the top edge of the surface 730, i.e. the edge between 730 and 740 on FIG. 7B.

Figure 9A:
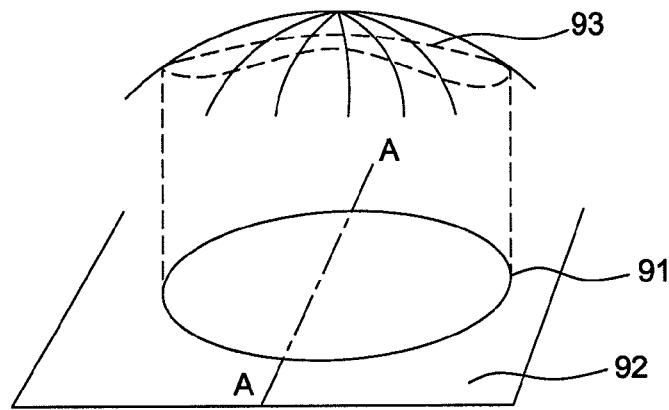
FIGS. 9A, 9B, 9C represent schemas illustrating the calculation of the non symmetrical revolution surface of the optical lens according to an embodiment of the invention.

The designer chooses a curve 2D shape in a plane, for instance an ovoid shape 91 belonging to plane 92 (FIG. 9A). The designer chooses the radius of curvature R0 of the liquid-liquid interface, when attached at top edge (this is usually the shape at 0 V). Then the top edge of the surface can be constructed as the intersection of the cylinder having curve 91 as generating curve, and the sphere of radius R0. This defines the curved surface 93 (it have a 3D shape).

The designer chooses also the contact angle θ0 for the starting position of the liquid-liquid interface.

Figure 9B:
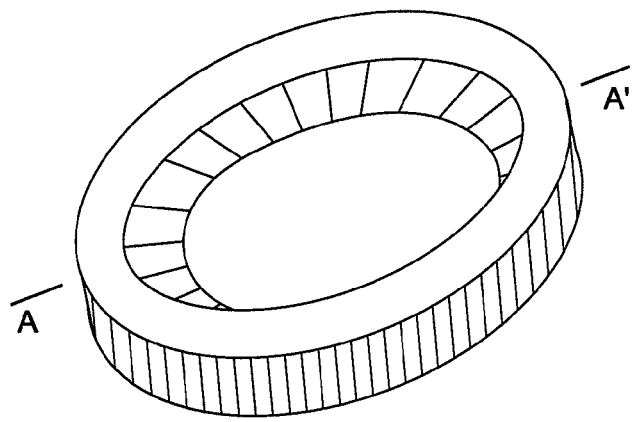
Figure 9C:
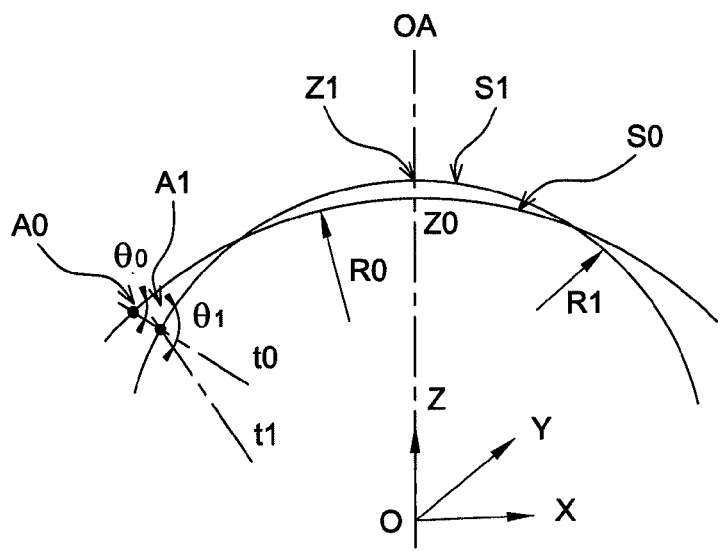

Iterations:

From the current position of the contact line 740, and from the current value of the contact angle θ, the designer will be able to predict the next position of the contact line 740. This is explained in this iteration. By sake of simplicity the shape is assumed to be not far from being axisymmetric. The treatment is more heavy without this hypothesis, but the principle is the same. With this hypothesis, it is easier to consider a cross-section of the supporting surface 730 and the liquid-liquid interface along AA' (FIGS. 9B and 9C). FIG. 9C illustrates such cross-section at iteration 0 and 1 of the iteration stage of supporting surface 730 calculation method.

The knowledge of the contact angle θ0 allows to determine at each point A0 of the curve S0 (liquid-liquid interface at the starting position), the local tangent t0 of the surface, as shown on the FIG. 9C. The new curve S1 (the liquid-liquid interface in a further position) will be located at A1, where A1 is on t0. The question is how to determine the distance A0-A1.

A1 is the intersection of the sphere with radius R1, chosen by the designer, and the tangent t0. The only remaining unknown is the vertical position of the sphere, which is indexed by Z1. Z1 should be determined by the condition that the liquid volume is kept constant. Once this condition applies, Z1 is determined, and also the new contact line 740 is known (the new curve corresponds to the ensemble of points A1).

Then the designer has to choose the new contact angle θ1.

The designer now has all inputs to be ready for a new iteration.

In a general manner, the designer should verify at the end of the calculation that the drop of liquid is stable and centered around the optical axis OA.

Further, the designer can choose to determine contact angles or the voltage, as there is a direct relationship between contact angle and voltage by the standard electrowetting formula:

$$\cos\theta = \cos\theta_0 + \frac{1}{2} \cdot \frac{\varepsilon\varepsilon_0}{e\gamma} V^2$$

Where θ is the contact angle (θ0 at 0 voltage), $\varepsilon$ and $\varepsilon_0$ are the insulator and vacuum permittivity, e is the dielectric thickness, γ is the liquid-liquid interfacial tension and V is applied voltage.

Note that the calculation above will be valid for one specific volume of liquid.

The figures have been drawn with convex curvature of the liquid-liquid interface, but the same method can be applied to concave or convex liquid interfaces (or positive and negative R0, R1, R2, etc. . . . ).

It is possible to modify the above described method to generate an elliptical shape of liquid-liquid interface as well. Or more generally, it is possible to generate a liquid-liquid surface progressively deformed from a given surface at 0V to become an other surface at higher voltages. This would be useful in applications where astigmatism needs to be varied at the same time than focus needs to be adjusted.

Having thus described at least one illustrative embodiment of the invention, various alterations, modifications and improvements will readily occur to those skilled in the art.

In particular, other methods known from the art can be used to calculate the supporting surface.

The invention claimed is:

1. An optical lens comprising:
   a cavity formed by two transparent windows and a peripheral frame positioned in between the two transparent windows, said cavity containing first and second liquids, non-miscible, forming an interface, said interface being movable by electrowetting on a wall of said peripheral frame by application of a voltage between first and second electrodes,
   wherein said wall has a non-symmetrical revolution surface, the geometrical shape of which is calculated such that said interface is of a substantially spherical or elliptical shape for at least one value of said voltage.

2. The optical lens according to claim 1, wherein the geometrical shape of the wall is calculated using finite elements method calculation.

3. The optical lens according to claim 1, wherein at least one of the windows is a fixed lens.

4. The optical lens according to claim 1, wherein the cavity and the electrodes are made of transparent material.

5. A spectacles comprising at least one optical lens according to claim 1, and adjustment means to control the focal length of said optical lens.

6. The spectacles according to claim 5, wherein the adjustment means are manual.

7. The spectacles according to claim 5, wherein the adjustment means are automatic and comprise a distance measurement device to estimate the distance of an object to be viewed by an user of the spectacles.

8. The spectacles according to claim 5, wherein the adjustment means are automatic and comprise a device for measuring the convergence of an user's eyes.

9. The spectacles according to claim 5, further comprising a power control for electrical alimentation of the adjustment means.

10. The spectacles according to claim 9, wherein the power control is an autonomous power supply arranged on the spectacles.

11. A method for forming an optical lens, comprising:
    providing a cavity formed by two transparent windows and a peripheral frame positioned in between, said cavity containing first and second liquids being non-miscible and forming an interface, said interface being movable by electrowetting on a wall of said peripheral frame by application of a voltage between first and second electrodes, said wall having a non-symmetrical revolution surface; and
    calculating the geometrical shape of said wall such that a substantially spherical or elliptical shape of the interface is generated for at least one value of said voltage.

12. The method for forming an optical lens according to claim 11, wherein the geometrical shape of said wall is calculated using finite elements method calculation.

13. The method for forming an optical lens according to claim 11, wherein the optical lens has a variable optical power.

14. The method for forming an optical lens according to claim 13, wherein the geometrical shape of said wall is calculated such that the interface is substantially spherical for n positions of the interface on said wall, n being greater than or equal to two.

* * * * *